April 24, 1956     J. C. MIERS     2,742,847
PRODUCTION OF POTATO GRANULES
Filed Jan. 3, 1955
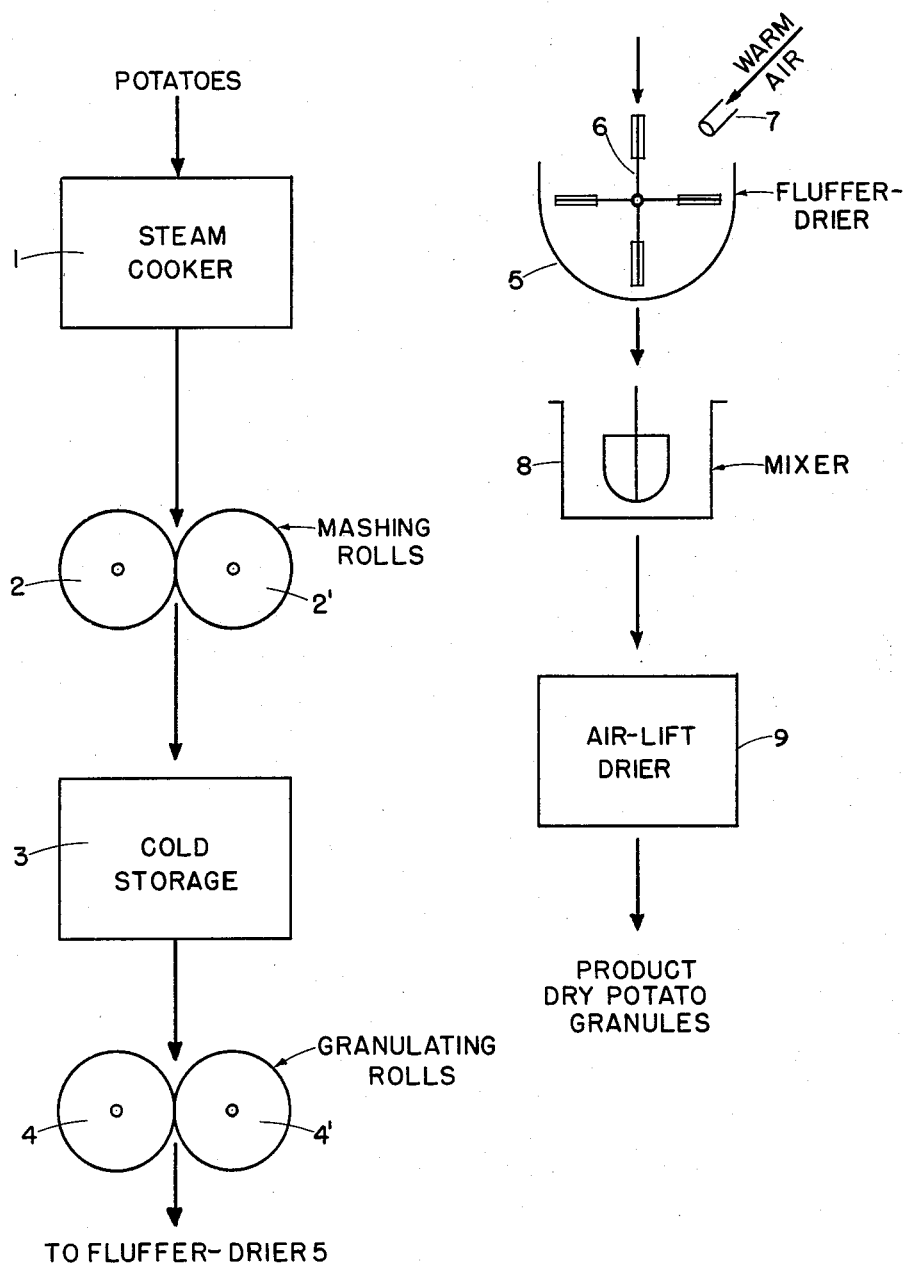
J. C. MIERS
INVENTOR
BY
ATTORNEYS

United States Patent Office 2,742,847
Patented Apr. 24, 1956

2,742,847
PRODUCTION OF POTATO GRANULES

Jackson C. Miers, Concord, Calif., assignor to the United States of America as represented by the Secretary of Agriculture Application January 3, 1955, Serial No. 479,689

2 Claims. (Cl. 99—207)

(Granted under Title 35, U. S. Code (1952), sec. 266)

A non-exclusive, irrevocable, royalty-free license in the invention herein described for all governmental purposes, throughout the world, with the power to grant sublicenses for such purposes, is hereby granted to the Government of the United States of America.

This invention relates to the preparation of potato granules. A particular object of the invention is the provision of methods whereby potato granules of high quality can be produced without the necessity for recycling previously dried material. Further objects and advantages of the invention will be obvious from the description herein, considered together with the annexed drawing.

The drawing represents a schematic flow sheet illustrating the steps applied in producing potato granules in accordance with this invention.

At present, potato granules are being manufactured on an extensive scale as a convenient source of ready-cooked potatoes for the home and the food processor. Potato granules consist of dehydrated potato tissue in the form of particles small enough to pass through a 60-mesh screen. By mixing potato granules with hot water, a mashed potato dish can be prepared ready for the table in a few minutes.

In the production of potato granules by conventional techniques, it is essential to continuously recycle previously dried material in order to obtain satisfactory operation. Thus in conventional practice, potatoes are peeled, sliced, then cooked in steam. The cooked potatoes are then mashed, for example, by running them through heated rolls. The mashed potatoes are then mixed with sufficient dried potato granules from a previous batch to give a moisture content of about 40% for the composite material. This material is then dehydrated in an air lift drier to produce the dried granules. The reason for the add-back step (recycling of previously dried granules) is that the mashed potatoes cannot be dried directly by known methods. If such direct drying is attempted it will be observed that the mashed potatoes tend to dry only on the outer surfaces forming a horny crust about the still-moist inner portions. However when the add-back step is applied the composite material (mixture of mashed potatoes and dried granules) forms a friable powder which can be readily dried to a uniform degree. In essence the add-back step has the effect of changing the mashed potatoes from an agglomerated mass to a damp powder which is well adapted to various dehydrating procedures. One disadvantage of add-back is that the dehydration equipment must continuously handle about five times as much material as is actually packaged. To further explain—in order to reduce the moisture content of the mashed potatoes (about 75 to 80%) to a level of 40% about equal weights of dried granules and mashed potatoes must be mixed. Then when this product is dried about 85% of it must be returned for recycling. It is thus obvious that only about one-sixth of the solid material being handled is product; the other five-sixths remain in the system. Naturally this means that the equipment must be several times as big as would be needed to handle a certain level of output and operating costs are necessarily increased. Another point is that this continuous recycling means that the product has been through the dehydrator about 6 times. Naturally any exposure of potato tissue to dehydrating conditions will subject it to conditions of heat and oxidative damage and to expose it many times will increase the amount of quality damage. A third problem caused by this continuous recycling is that the system is very inflexible and if a bad lot of material is produced it will take considerable production before the effect of this bad lot is essentially eliminated. This is caused by the fact that five-sixths of the bad lot must be recycled with the result that each successive lot will contain a proportion of the bad material. Oftentimes it will take several hours of production to eliminate the effect of one bad lot. Naturally much thought has been given in the industry to schemes for eliminating the add-back procedure. However, despite much investigation and experimentation no practical process has been heretofore devised.

In the process of this invention the add-back step is eliminated with the result that the many disadvantages explained above are not encountered. The process of this invention can best be explained by reference to the attached drawing. Referring to this drawing, potatoes are peeled, washed, cut into slices or slabs, then cooked by application of steam thereto in cooker 1. The cooked potatoes are then pressed between rolls 2, 2' to form mashed potatoes. These rolls are preferably heated to about 140° F. and are spaced about 0.08 in. apart.

The mashed potatoes are then cooled to about room temperature and placed in cold storage, indicated by 3 in the drawing. This cold storage is necessary to toughen the cell walls and cell contents of the potato tissue, so that the potato material can be subsequently treated without rupture of the cells. To prepare a high quality product, the cells must be maintained intact throughout the process whereby the product will reconstitute to fluffy mashed potatoes. Where cell rupture occurs starch will be released from the cells and the reconstituted product will by pasty and unpalatable. In this cold storage treatment which may be termed a tempering or conditioning, the mashed potatoes are maintained at about 32–40° F. for a considerable period on the order of 8 to 24 hours, depending on the variety of potatoes, season, degree of maturity, etc.

After the conditioning the potatoes are granulated. This is preferably performed by pressing them between rolls 4 and 4'. These rolls are maintained at about room temperature but are placed very close together—on the order of 0.01 to 0.02 inch clearance—so that the potatoes are reduced to a layer that is essentially one cell thick. By this treatment the potatoes still having their natural moisture content (about 75–80%) are reduced to particles having a thickness of essentially one cell. Further in these particles the cell walls are essentially intact.

The granulated material is then partially dried in what is termed a fluffer-drier. This device consists of a U-shaped trough 5 containing paddles 6. The granulated potatoes are placed in trough 5 where they are continuously fluffed or agitated by the action of rotating paddles 6. These paddles are rotated at a slow rate to cause repeated turning over of the particles without any shearing or compressive action on the potatoes. While being fluffed the potatoes are subjected to a draft of warm air from duct 7 at about 100–200° F. This drying is continued until the material is reduced to a friable powder having a moisture content of about 40 to 45%.

It is to be noted that the combination of granulation followed by fluff-drying is a critical feature of this invention. By these steps the potatoes are reduced to a friable powder without the necessity of adding previously dried granules. Thus in the step of granulation the mashed potatoes are reduced, without cell damage, to particles having a thickness of one cell. In the subsequent fluff-drying the granulated particles are subjected to fluffing and contact with warm air whereby agglomeration of the granulated material is prevented and the material is reduced to a friable powder which is eminently suitable for final drying to form dried granules.

From the fluffer-drier 5, the friable potato powder is preferably allowed to stand at room temperature for tempering, that is, to allow the moisture to equilibrate throughout the mass. The material may then be mixed to further ensure uniformity in mixer 8. In many cases this tempering and mixing may be eliminated without impairing the quality of the final product.

The friable potato powder is then subjected to dehydration in drier 9 which is preferably of the type disclosed by Olson et al. in patent application Serial No. 325,745, filed Dec. 12, 1952. This device consists essentially of a vertically positioned duct. Hot air at about 300° F. is forced upwardly at high velocity (i. e. about 1000 ft./min.) through the pipe and the friable potato powder is fed into this air stream. As the current of air carries the powder upward it is dehydrated. At the top of the duct is a conically diverging diffuser so that as the said current rises into the diffuser its velocity is gradually reduced. A deflector is positioned above the diffuser whereby the now slowly moving current is deflected downward causing the dried potato granules to drop out of the air stream so that they can easily be separated from the exhaust, moist air.

The invention is further illustrated by the following example.

Raw potatoes of the Russet variety (sp. g. above 1.080) were peeled, washed and cut into slabs. The potatoes were then cooked by exposing them to steam in a vessel for about 25-30 minutes. The cooked potatoes were allowed to cool until their temperature was about 150° F. then they were coarsely mashed between double drum rollers heated to 145° F. and set 0.08 inch apart. The coarse mash was allowed to cool to room temperature then placed in tightly sealed containers and stored in a cooler at 35° F. for about 16 hours.

The tempered mashed potatoes were then put through double drum rollers maintained at room temperature and set 0.012 inch apart. The drums used had a diameter of 12 inches and were rotated at one R. P. M. The mashed potatoes were thus granulated into particles having a thickness of essentially one cell. Samples of the granulated material were examined microscopically and it was found that only 5% of the cells were damaged.

The granulated material was placed in a fluffer-dryer consisting of a U-shaped trough 8" wide and provided with a series of paddles mounted on a longitudinal shaft which was rotated at 3 R. P. M. While the granulated potatoes were agitated by the paddles air at 140° F. was blown into the trough. It was observed that the potato material first adhered to the paddles but as the drying continued a friable powder was formed. This powder had a moisture content of 40%.

The powder was then allowed to stand several hours at room temperature until it was cool then mixed thoroughly. The powder was then dehydrated by contact with air at 110° C. in an air lift drier as described in the Olson et al. application cited above.

The dried product having a moisture content of 9% was screened and it was found that 85% of it passed through a 60-mesh screen. Cell damage was determined by microscopic count and found to be 4 to 6% for several runs.

A sample of the dried granules was agitated with hot water to form mashed potatoes which were found to have a good natural color and flavor, a mealy texture and which were not sticky. A comparison with mashed potatoes prepared from granules prepared by the conventional add-back process showed that the mashed potatoes from the product of this invention had a mealier texture than the mashed potatoes from the granules made by the add-back process.

Having thus described the invention, what is claimed is:

1. A process for producing dried potato granules without the necessity for recycling previously dried potato material which comprises subjecting cooked, mashed, and granulated potato particles having a thickness of essentially one cell and having a moisture content of about 70-85% to a current of warm air at a temperature about from 100° to 200° F. while constantly fluffing the particles by mechanical action but without subjecting the particles to mechanical damage whereby the particles are partially dried to form a friable powder having a moisture content about from 40 to 45 percent.

2. A process for producing dried potato granules without the necessity for recycling previously dried potato material which comprises reducing tempered, cooked, mashed potatoes to granulated potato pieces having a thickness of about one cell and a moisture content of about from 70 to 85%, subjecting the granulated product to a current of warm air at a temperature about from 100° to 200° F. while it is subjected to constant fluffing action to form a partially-dried friable powder having a moisture content about from 40 to 45 percent.

References Cited in the file of this patent
UNITED STATES PATENTS 2,707,684 McCready et al. _____ May 3, 1955

FOREIGN PATENTS 589,830 Great Britain _____ July 1, 1947